United States Patent [19]

Barabas

[11] Patent Number: 4,600,759
[45] Date of Patent: Jul. 15, 1986

[54] PROCESS FOR MAKING COPOLYMERS OF VINYLPYRROLIDONE AND MALEIC ANHYDRIDE

[75] Inventor: Eugene S. Barabas, Watchung, N.J.

[73] Assignee: Gaf Corporation, Wayne, N.J.

[21] Appl. No.: 679,780

[22] Filed: Dec. 10, 1984

[51] Int. Cl.⁴ .................... C08F 222/06; C08F 226/10
[52] U.S. Cl. .................................... 526/207; 526/264
[58] Field of Search ....................... 526/207, 264, 271

[56] References Cited

U.S. PATENT DOCUMENTS

| | | | |
|---|---|---|---|
| 2,676,949 | 4/1954 | Morner et al. | 526/264 |
| 3,116,264 | 12/1963 | Wahl | 526/264 |
| 4,137,392 | 1/1979 | Gross | 526/264 |
| 4,147,850 | 4/1979 | Hutton et al. | 526/207 |

*Primary Examiner*—Harry Wong, Jr.
*Attorney, Agent, or Firm*—Joshua J. Ward; Marilyn J. Maue

[57] ABSTRACT

Process for copolymerization of vinylpyrrolidone and maleic anhydride in the presence of organic solvent, catalyst and between about 0.1 and 1.0 weight % water.

6 Claims, No Drawings

PROCESS FOR MAKING COPOLYMERS OF VINYLPYRROLIDONE AND MALEIC ANHYDRIDE

BACKGROUND OF THE INVENTION

Copolymers of maleic anhydride and N-vinyl2-pyrrolidone (referred to herein as vinylpyrrolidone) are well known and are described for instance in U.S. Pat. No. 2,676,949 the disclosure of which is incorporated herein by reference. Such copolymers have a number of uses but are especially useful in removing rust from metal surfaces as described in U.S. Pat. No. 4,424,079.

Copolymers of vinylpyrrolidone and maleic anhydride can be made in a variety of molecular weights but it has previously been necessary to use varying reaction conditions to make such copolymer of varying molecular weights. In general, more severe reaction conditions, i.e. higher temperatures or pressures produce copolymer of relatively lower molecular weight while less severe conditions produce copolymer of relatively higher molecular weight.

SUMMARY OF THE INVENTION

In accordance with the present invention it is possible to make copolymers of vinylpyrrolidone and maleic anhydride in a variety of molecular weights using the same equipment and reaction conditions but adding controlled amounts of water to the otherwise anhydrous reaction system.

The process of the invention is a process for copolymerization of vinylpyrrolidone and maleic anhydride in the presence of organic solvent and catalyst and in the presence of between about 0.1 and about 1.0 weight % water.

DETAILED DESCRIPTION OF THE INVENTION

The invention involves the use of small amounts, i.e. between about 0.1 and about 1.0 weight %, of water in an otherwise conventional process for copolymerization of vinylpyrrolidone with maleic anhydride in the presence of organic solvent and catalyst. The use of such small, controlled amounts of water in an otherwise anhydrous process has been found to have a very significant influence on the molecular weight of the resulting poly(vinylpyrrolidone-co-maleic anhydride) product. In general, the molecular weight of the copolymer has been found to be inversely proportionate to the amount of water added in the range of 0.1-1.0 weight % water based on total contents of the reaction zone. This allows copolymer of varying molecular weights to be made in the same equipment using the same conditions of time, temperature and pressure and varying only the small controlled amounts of water used.

In addition to the convenience offered by being able to use the same operating conditions to produce copolymers of different molecular weights the present invention allows the production of relatively low molecular weight copolymers under less severe operating conditions, i.e. at lower temperatures and pressures, than would be required for production of such low molecular weight product using conventional anhydrous reaction conditions.

In practicing the invention organic solvent and catalyst used are conventional and are used in conventional amounts. Solvent is for instance frequently present in amounts of between about 30 and about 90 wt % based on total amount of reactants and catalyst is frequently present in amounts between about 0.05 and about 5 wt % based on the amount of monomers present. Suitable organic solvents include such conventional materials as benzene, toluene or xylene as well as similar halogenated aromatic hydrocarbons. It should be understood however, that any solvent may be used which under the reaction conditions involved dissolves the monomers but not the formed polymer.

Conventional catalysts or initiators suitable for use in the invention include for instance those mentioned in U.S. Pat. No. 2,676,949.

Copolymer made according to the invention may have any desired molecular weight but the process of the invention is normally used in the manufacture of copolymers have K values between about 15 and about 50. K value is a function of molecular weight and as used herein is calculated by the method set forth in the Encyclopedia of Chemical Technology, Vol. 21, 2nd Ed., p. 427–428 (John Wiley and Sons, 1970).

The process of the invention may be run continuously or as a batch operation or a modified batch operation in which maleic anhydride is added continuously or intermittently to a reaction zone containing the vinylpyrrolidone solvent and catalyst. Operating conditions will vary depending upon the molecular weight desired and are to a large extent interdependent. In general, however, reaction temperatures between about 40° C. and about 120° C. and pressures between atmospheric and about 10 psi will normally be used in conjunction with reaction times of between about 2 and about 12 hours.

The following Examples are intended to illustrate the invention without limiting the scope thereof. Example 1 was a control run in which anhydrous conditions were maintained in the reaction zone in accordance with conventional practice. Examples 2–5 were runs in accordance with the invention in which small amounts of water were used in the reaction zone. Except as indicated below, the operating procedure of Example 1 was followed for the remainder of the Examples and the same amounts of the same ingredients were used. The apparatus used for these Examples included a two-liter resin kettle equipped with mechanical agitator, gas inlet tube, dropping funnel and thermometer.

The amount of water used for each Example as well as the K value and relative viscosity of each copolymer product were as shown in Table I below. Relative viscosity as reported herein is the ratio of the flow time of a 1% polymer solution in water to the flow time of water alone in the same Cannon-Fenske viscosimeter.

In addition to water as indicated below each example used 840.0 grams dried toluene, 120.0 grams maleic anhydride, 170.0 grams vinylpyrrolidone and 16.0 grams VAZO 52 in toluene (20%). VAZO 52 is 2,2'-azobis(2,4-dimethylvaleronitrile) initiator available from E. I. duPont de Nemours & Company.

EXAMPLE 1

(Control Experiment)

The following procedure was used:

(1) The maleic anhydride was dissolved in 480.0 grams of toluene at 70° C. The solution was placed in a dropping funnel.

(2) Vinylpyrrolidone and 360 g of toluene were charged to the reaction vessel. The system was purged thoroughly with nitrogen.

(3) The temperature of the reaction kettle was raised to 55° C. and VAZO 52 solution was added.

(4) Addition of the maleic anhydride solution was started. It was added in 2½ hours.

(5) After the addition was completed, the system was agitated at 55° C. for one hour.

(6) A sample was taken and found negative using triphenyl phosphine paper.

(7) The precipitated polymer was filtered, reslurried in 1500 ml dry heptane, and refiltered.

(8) The polymer was air-dired for one hour, then dried in a vacuum oven at 60° C.

Analysis of the product indicated the following:
Total Solids: 97.63%
Rel. Viscosity (1%): 1.490
K-value: 43.0
Brookfield Visc. (35%): 5040 cps
ph (35%): 2.0

EXAMPLE 2

Materials charged for this Example were the same as those used in Example 1 except for the addition of 11.5 grams (1.0%) distilled water to the materials in the kettle. The procedure was similar to that described for Example 1 except that the sample taken in step 6 was found to be positive, indicating that not all of the maleic anhydride had been consumed. Accordingly, 1.8 additional grams of a 20% VAZO 52 solution in toluene was added and the system was stirred at 55° C. for an additional hour. The triphenyl phosphine paper test was again positive. Additional stirring and two more similar tests at additional intervals of one hour each continued to yield positive results.

Analysis of the product for this Example indicated the following:
Total Solids: 91.45%
Rel. Viscosity (1%): 1.111
K-value: 19.1
Brookfield Visc. (35%): 180 cps
ph (35%): 1.8

EXAMPLE 3

This Example was similar to Example 2 except that the amount of water used was 5.7 grams (0.5%). Analysis of the product indicated the following:
Total Solids: 94.34%
Rel. Viscosity (1%): 1.138
K-value: 21.8
Brookfield Visc. (35%): 175 cps
pH (35%): 1.8

EXAMPLE 4

This Example was similar to Example 2 except that the amount of water used was 2.85 grams (0.25%). Analysis of the product indicated the following:
Total Solids: 93.73%
Rel. Viscosity (1%): 1.287
K-value: 32.8
Brookfield Visc. (35%): 1300 cps
pH (35%): 2.2

EXAMPLE 5

This Example was similar to Example 1 except that the amount of water used was 1.15 grams (0.1%). Analysis of the product indicated the following:
Total Solids: 93.94%
Rel. Viscosity (1%): 1.430
K-value: 40.3
Brookfield Visc. (35%): 1496 cps
pH (35%): 2.2

TABLE I
Summary of Results

| Water Added (wt %) | K Value | Rel. Viscosity (1%) |
|---|---|---|
| 0.0 | 43.0 | 1.490 |
| 0.1 | 40.3 | 1.430 |
| 0.25 | 32.8 | 1.287 |
| 0.5 | 21.8 | 1.138 |
| 1.0 | 19.1 | 1.111 |

While the invention has been described above with respect to preferred embodiments thereof, it will be understood by those skilled in the art that various changes and modifications may be made without departing from the spirit or scope of the invention.

What is claimed is:

1. In a process for copolymerization of vinylpyrrolidone and maleic anhydride in the presence of catalyst and organic solvent for the vinylpyrrolidone and maleic anhydride monomers, in which solvent the resulting copolymer is insoluble, the improvement which comprises conducting such copolymerization in the presence of between about 0.1 and about 1.0 weight % water.

2. Process according to claim 1 wherein the copolymerization is conducted at a temperature between about 40° C. and about 120° C., a pressure between atmospheric and about 10 psi for a total reaction time between about 2 hours and about 12 hours.

3. Process according to claim 1 wherein the solvent is present in an amount between about 30 and about 90 wt % based on the total amount of reactants and catalyst is present in an amount between about 0.05 and about 5 wt % based on the amount of monomers present.

4. Process according to claim 1 wherein the product of the process has a K value between about 15 and about 50.

5. Process according to claim 1 wherein the solvent is benzene, toluene or xylene.

6. Process according to claim 1 wherein:
(a) the copolymerization is carried out at a temperature between about 40° C. and about 120° C., a pressure between atmospheric and about 10 psi and for a total reaction time between about 2 hours and about 12 hours;
(b) solvent is present in an amount between about 30 and about 90 wt % based on the total amount of reactants present and the solvent is benzene, toluene or xylene; and
(c) the product of the process has a K value between about 15 and about 50.

* * * * *